United States Patent [19]

McFarland et al.

[11] Patent Number: 5,359,687
[45] Date of Patent: Oct. 25, 1994

[54] POLYMER MICROSTRUCTURES WHICH FACILITATE FIBER OPTIC TO WAVEGUIDE COUPLING

[75] Inventors: Michael J. McFarland, Washington; Karl W. Beeson, Princeton, both of N.J.

[73] Assignee: AlliedSignal Inc., Morristown, N.J.

[21] Appl. No.: 111,254

[22] Filed: Aug. 23, 1993

[51] Int. Cl.⁵ .................................................. G02B 6/30
[52] U.S. Cl. ............................................ 385/49; 385/52; 430/321; 430/326
[58] Field of Search ............................. 385/49, 50, 52; 430/320, 321, 325, 326, 329

[56] References Cited

U.S. PATENT DOCUMENTS

| | | | |
|---|---|---|---|
| 4,735,677 | 4/1988 | Kawachi et al. | 156/633 |
| 4,750,799 | 6/1988 | Kawachi et al. | 385/50 X |
| 4,767,174 | 8/1988 | Carenco et al. | 385/97 |
| 4,796,975 | 1/1989 | Lukas et al. | 385/49 X |
| 4,828,362 | 5/1989 | Skinner et al. | 385/50 X |
| 4,883,743 | 11/1989 | Booth et al. | 430/321 |
| 4,973,126 | 11/1990 | Degani et al. | 385/55 |
| 5,150,440 | 9/1992 | Booth | 385/49 |

OTHER PUBLICATIONS

English Translation of Kokai Patent Publication 5-117348, May 14, 1993.

*Primary Examiner*—John D. Lee
*Attorney, Agent, or Firm*—Melanie L. Brown; Roger H. Criss

[57] ABSTRACT

The present invention is directed to an optical coupling device for facilitating the coupling of an optical fiber to an optical waveguide and to a method for fabricating such coupling device. Another aspect of this invention relates to optical fiber to optical waveguide interconnect comprising the coupling device of this invention, and arrays comprising a plurality of such arrays.

31 Claims, 11 Drawing Sheets

POLYMER MICROSTRUCTURES WHICH FACILITATE FIBER OPTIC TO WAVEGUIDE COUPLING

BACKGROUND OF THE INVENTION

1. Field of the Invention

The present invention is directed to an optical coupling device for facilitating the coupling of an optical fiber to an optical waveguide and to a method for fabricating such coupling device. Another aspect of this invention relates to optical fiber to optical waveguide interconnect comprising the coupling device of this invention, and arrays comprising a plurality of such arrays.

2. Description of the Prior Act

Recent developments in the area of optical communications have provided a large number of optical waveguide devices for the control and routing of light. Optical waveguide devices which are created on independent substrates are often referred to as planar integrated optical devices or photonic devices. These devices can be further characterized as passive devices, those which serve only to route the propagation of light along a particular path, and active devices, those which control some function of the propagating light, such as its intensity or polarization, or which dynamically control the path along which the light propagates. However, the propagation of light on a substrate bearing an optical waveguide is usually suitable only for short propagation distances, usually much less than a meter. For longer distance propagation the optical fiber is the medium of choice due to its excellent transmission characteristics and ability to be fabricated in lengths of many kilometers. Therefore, if an optical waveguide device is to be utilized in an optical communication or sensor or distribution system, it is usually required that it be coupled to an optical fiber at least one point, and often at many points, on the substrate, An optical waveguide device which has been coupled to lengths of optical fibers for ease of insertion into an optical fiber system is sometimes referred to as a "pigtailed" waveguide device by those skilled in the art. Light propagates through the core region of optical fibers and these core regions can be as small as a few microns in diameter. Thus, in order that the fiber to waveguide coupling is accomplished in an efficient manner that does not waste most of the light, the alignment of the fiber to the waveguide is of necessity a critical parameter. Numerous articles and methods have been devised in the prior art to provide for efficient coupling of optical fibers to substrates bearing optical waveguide devices. The need for critical alignment tolerances has resulted in a high degree of complexity and cost for these devices and methods of the prior art. There are many descriptions of methods which utilize silicon "V-grooves" as a positioning element, such as U.S. Pat. No. 4,767,174, which make use of the fact that certain crystalline orientations of silicon can be preferentially etched to a high degree of accuracy. This is accomplished by a series of lithographic steps including resist coating and exposure, followed by liquid etching. However, the V-groove, once fabricated, serves only to position the optical fiber relative to the surface of the silicon wafer. It still remains to position the fiber end relative to the waveguide end. This is usually accomplished by micromanipulation of the two components relative to each other followed by fixing the alignment by an optical quality glue. Micromanipulation is an expensive and time consuming operation for use in a manufacturing operation. Alternatively, the V-groove and optical fiber can be positioned relative to the waveguide by the use of additional positioning elements, but these also increase the complexity and therefore cost of the method. Even when the V-groove technique is utilized only to couple two optical fibers to one another, as in U.S. Pat. No. 4,973,126 there are several additional positioning elements required. Also, the V-groove techniques serve to position an optical fiber relative to some surface, such as that of the silicon itself, but the V-groove does not provide any force to retain the optical fiber in position. That is, the optical fiber can easily slip out of the groove unless one or more additional elements are present to provide some retaining force. Typically, a cover plate or a second substrate containing V-grooves is forced down in contact with the optical fibers to hold them in the V-grooves and an optical cement or photopolymer is used to hold the assembly together.

Several methods have been taught in the prior art for creating optical fiber positioning devices on the substrate which also bears a waveguide or integrated optical device. These techniques do serve to reduce the overall number of separate elements which must be assembled to complete the optical fiber to waveguide coupling. However, the techniques still remain complex in manufacture or they lack sufficient retaining force to provide a simple, low-cost, yet effective method of providing such a coupling. U.S. Pat. No. 5,150,440 describes a method wherein waveguides are printed in a plastic film, in which film are subsequently created rectangular grooves, as by excimer laser ablation of the film near the waveguide terminus. Subsequently, the film bearing the waveguide and grooves is laminated on both sides with additional film layers such that the openings of square cross section are created in the plane of the waveguide. The ends of the openings are generally made accessible and smooth by a subsequent microtoming step. The square opening is then filled with a liquid photopolymer adhesive and optical fibers are then admitted into the square opening and fixed in place with a cementing process. This method involves a large number of manufacturing steps such as lamination and excimer laser ablation and is limited to the specific waveguide type of invention, that is, to waveguides created in thin plastic sheets of the same order thickness as the waveguide which can be conveniently notched by methods such as laser ablation. The method does not provide for a convenient method of attaching optical fibers to optical waveguides created on other useful substrates such as semiconductor wafers, polyimide circuit board materials, glass, lithium niobate and other crystalline and ceramic substrates. Neither does it provide for a method of attaching optical fibers to any film except those which are the thickness of the optical waveguide, unless they are supported on another layer which is removable after the notching process, which adds further complexity to the manufacturing process. U.S. Pat. No. 4,735,677 describes a method for providing guides for aligning optical fibers on the surface of a silicon substrate. In this method it is necessary to first grow a layer of glass on the silicon wafer by a soot process wherein a glass precursor is treated by flame hydrolysis to deposit glass particles on the silicon, followed by heating in an electric furnace to consolidate the glass. This layer of glass is then lithographically patterned and etched, as by reactive ion etching (RIE), to form the positioning elements. After formation of these elements, an optical fiber can be inserted between them and fixing is accomplished with an adhesive or by melting the glass with a $CO_2$ laser beam. This technique involves a great number of processing steps and is limited to substrates which are not damaged by high temperature processes or those which do not contain sensitive electronic devices which would be damaged by an RIE etch. A number of desirable substrates for waveguide devices such as polyimide printed circuit boards and polycarbonate would not be useful for these reasons. Further, like the V-groove techniques, it serves only to position the optical fibers yet provides no rigidity or retaining force to the coupling except through the addition of an adhesive or another high temperature melting process. Several methods for forming fiber optic positioning devices in molded thermoplastics are provided. Japan Kokai Patent 278004 provides for optical fiber guide grooves of approximately triangular cross section by a method of compression molding a thermoplastic resin in a die. This essentially provides a die-molded plastic version of a silicon V-groove. While eliminating the need for a lithographic etch to produce the V-grooves, the remaining drawbacks of the technique remain. Thus the need to align the V-grooves to the waveguide is still present and the need for additional elements to hold the fiber optics into the V-grooves still exists and is taught in Kokai Patent 278004. Japan Patent Publication 254404 further teaches hybrid optical circuits formed by die-molding an inorganic glass or a plastic resin. The result is a substrate bearing positioning elements for optical devices and optical fibers such as with U.S. Pat. No. 4,735,677, but without the need to deposit a soot layer and etch. However, the shape of the optical fiber holding channel must be such that the dimension of the top is equal to or larger than the bottom, or it will be difficult or impossible to release the substrate from the die mold. Japan Patent Publication 254404 teaches that release from the mold is made easier if the holding blocks are made V-shape or trapezoid shape with the top of the channel larger than the bottom of the channel. Thus again, this method partially solves the problem of positioning an optical fiber relative to a waveguide, but does not provide for a secure retaining force on the fiber. In all of these prior art methods, some force must be applied to hold the optical fiber within the positioning grooves. Further, if a liquid optical cement or photoactive monomer or optical matching fluid is introduced to the coupling region it will wet between the optical fiber and the wall of the positioning groove by the force of capillary action. This will serve to float the fiber within the groove and thus misalign it with the waveguide, unless the secondary element is present to hold the optical fiber down within the groove with a greater force. The methods of die molding a plastic resin suffer the additional drawback of the necessity of maintaining the die free of any contamination. If the grooves in the master die which will form the waveguide or the positioning elements become contaminated on repeated use, the error will be faithfully repeated on each successive molding, and prevent accurate optical fiber positioning. Finally, in the die mold method of Japan Patent Publication No. 254404, the substrate, waveguide and positioning elements are formed together from the same material. This precludes the ability to position optical fibers to waveguides created on other desirable substrates such as silicon wafers, lithium niobate wafers and printed circuit boards, and limits the choice of waveguide material to the class of die-moldable plastics and glasses.

Thus, the need remains for devices and methods which allow for simple, accurate positioning of optical fibers to optical waveguides on a variety of desirable substrates, which do not require many additional manufacturing steps or positioning elements or elaborate alignment by micromanipulator and which provide a secure retaining force to the optical fiber without the need for additional elements held in place by optical adhesives or thermal heat treatments.

SUMMARY OF THE INVENTION

One aspect of this invention is directed to an optical coupling device comprising:

a substrate having a surface region at a pre-determined position on a surface of said substrate for placement of an optical waveguide; and a channel on the surface of said substrate for optically aligning and coupling an optical fiber having a diameter dimension $d_1$ and an optical waveguide positioned at said predetermined position, wherein the longitudinal axis of said channel is in alignment with said predetermined position such that on placement of said optical fiber in said channel and placement of said optical waveguide in said position the light carrying core of said fiber and said waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2 d_1$, and $d_2$ are selected such that:

(a) $W_2$ is greater than $W_1$;

(b) $d_2$ is greater than $\frac{1}{2} d_1$; and (c) $d_f$ is greater than $W_1$ and is equal to or less than $W_2$, wherein on placement of said optical fiber in said channel the force required to displace said optical fiber from said channel is equal to or greater than about 0.01 Newton (N), as determined by the test method depicted in FIG. 10 and described herein below (hereinafter referred to as "retaining force test").

Another aspect of this invention is directed to a optical coupling device with an optical waveguide comprising:

a substrate;

an optically transmissive waveguide on a surface of said substrate; and a channel on the surface of said substrate for optically aligning and coupling an optical fiber having a diameter dimension $d_1$ and said optical waveguide, wherein the longitudinal axis of said channel is in alignment or substantially in alignment with said waveguide such that on placement of said optical fiber in said channel the light carrying core of said fiber and said waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:

(a) $W_2$ is greater than $W_1$;

(b) $d_2$ is greater than $\frac{1}{2} d_1$; and
(c) $d_1$ is greater than $W_1$ and is equal to or less than $W_2$, wherein on placement of said optical fiber in said channel the force required to displace said optical fiber from said channel is equal to or greater than about 0.01 Newton (N), as determined by retaining force test.

Still another aspect of this invention relates to an optical fiber to optical waveguide interconnect comprising:

a substrate;

an optically transmissive waveguide positioned on a surface of said substrate; and a channel on the surface of said substrate for optically aligning and coupling an optical fiber having a diameter dimension $d_1$ and said optical waveguide, wherein the longitudinal axis of said channel is in alignment or substantially in alignment with said waveguide, said channel having said optical fiber positioned therein such that the light carrying core of said fiber and said waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:

(a) $W_2$ is greater than $W_1$;
(b) $d_2$ is greater than $\frac{1}{2} d_1$; and
(c) $d_1$ is greater than $W_1$ and is equal to or less than $W_2$, wherein the force required to displace said optical fiber from said channel is equal to or greater than about 0.01 Newton (N), as determined by retaining force test.

Yet another aspect of this invention is directed to an improved pigtailed planar optical device having a plurality of optical waveguide to optical fiber interconnects on the substrate of this invention and a packaged planar optical device comprising the improved pigtailed planar optical device enclosed in a polymeric package.

Still another aspect of this invention relates to a method for forming an optical coupling device comprising a substrate having a surface region at pre-determined position on a surface of said substrate for placement of an optical waveguide, and a polymeric optical fiber positioning element for optically aligning and coupling an optical fiber having a diameter $d_1$ and said optical waveguide positioned at said predetermined position, said polymeric optical fiber positioning element comprising a channel having sidewalls, wherein the longitudinal axis of said channel is in alignment or substantially in alignment with said pre-determined position, such that on placement of said optical fiber in said channel and said optical waveguide in said pre-determined position, said optical fiber and said optical waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:

(a) $W_2$ is greater than $W_1$;
(b) $d_2$ is greater than $\frac{1}{2} d_1$; and
(c) $d_1$ is greater than $W_1$ and is equal to or less than $W_2$, wherein the force required to displace said optical fiber from said channel is equal to or greater than about 0.01 Newton (N), as determined by retaining force test, said process comprising the steps of:

a) placing a layer comprising one or more photopolymerizable monomers onto a surface of a substrate;

b) exposing said layer to a pattern of actinic radiation to form an exposed pattern of polymerized monomer having the surface dimensions of said polymer positioning element and a pattern of unexposed monomer; and c) developing said layer by removing said unexposed monomer to form said polymer positioning element on the surface of said substrate wherein the longitudinal axis of said waveguide is in alignment or substantially in alignment with said position.

This invention also relates to a method for forming an optical coupling device with an optical waveguide comprising a substrate, an optically transmissive waveguide positioned on a surface of said substrate, and a polymeric optical fiber positioning element for optically aligning and coupling an optical fiber having a diameter $d_1$ and said optical waveguide, said polymeric optical fiber positioning element comprising a channel having sidewalls, wherein the longitudinal axis of said channel is in alignment or substantially in alignment with the longitudinal axis of said waveguide, such that on placement of said optical fiber in said channel said optical fiber and said optical waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:

(a) $W_2$ is greater than $W_1$;
(b) $d_2$ is greater than $\frac{1}{2} d_1$; and
(c) $d_1$ is greater than $W_1$ and is equal to or less than $W_2$, wherein the force required to displace said optical fiber from said channel is equal to or greater than about 0.01 Newton (N), as determined by retaining force test, said process comprising the steps of:

a) placing a layer comprising one or more photopolymerizable monomers onto a surface of a substrate having a waveguide thereon;

b) exposing said layer to a pattern of actinic radiation to form an exposed pattern of polymerized monomer having the surface dimensions of said polymer positioning element and a pattern of unexposed monomer; and c) developing said layer by removing said unexposed monomer to form said polymer positioning element on the surface of said substrate wherein the longitudinal axis of said channel is in alignment or substantially in alignment with the longitudinal axis of said waveguide.

Yet another aspect of this invention relates to a method for forming an optical coupling device with an optical waveguide comprising a substrate, a polymeric optically transmissive waveguide positioned on a surface of said substrate, and a polymeric optical fiber positioning element for optically aligning and coupling an optical fiber having a diameter $d_1$ and said optical waveguide, said polymeric optical fiber positioning element comprising a channel having sidewalls, wherein the longitudinal axis of said channel is in alignment or substantially in alignment with the longitudinal axis of said waveguide, such that on placement of said optical fiber in said channel said optical fiber and said optical waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:

(a) $W_2$ is greater than $W_1$;
(b) $d_2$ is greater than $\frac{1}{2} d_1$; and
(c) $d_1$ is greater than $W_1$ and is equal to or less than $W_2$, wherein the force required to displace said optical fiber from said channel is equal to or greater than about 0.01 Newton (N), as determined by retaining force test, said process comprising the steps of:

a) placing a layer comprising one or more photopolymerizable monomers onto a surface of a substrate;
b) exposing said layer to a pattern of actinic radiation to form an exposed pattern of polymerized monomer having the surface dimensions of said polymer positioning element and said waveguide, and a pattern of unexposed monomer; and
c) developing said layer by removing said unexposed monomer to form said polymer positioning element on the surface of said substrate wherein the longitudinal axis of said channel is in alignment or substantially in alignment with the longitudinal axis of said waveguide.

This invention exhibits one or more advantages. For example, it is useful on a wide variety of substrates on which optical waveguides are desired. It does not involve any high temperature processing which may deleteriously affect the substrate or optical waveguide. It utilizes a photolithographic method which combines both high positioning or alignment accuracy with simplicity of manufacturing method and low cost. It provides for a firm retaining force on the optical fiber, thus simplifying the attachment of optical fibers to optical waveguides, especially for the important case of attaching multiple fibers or arrays of optical fibers to a single substrate or optical waveguide array. It provides for an accurate alignment and firm retention of an optical fiber positioned in a small area on the optical waveguide substrate, thus allowing for a higher density of optical interconnects than methods of the prior art which utilize bulky clips and positioning elements. It provides a unique geometry to the optical fiber positioning channel which is not provided by prior devices and methods for fabricating same. Finally, it allows for simple assembly of optical fibers to optical waveguides, without the necessity of complex, expensive positioning devices, which would adversely affect the cost of manufacture.

BRIEF DESCRIPTION OF THE INVENTION

The invention will be more fully understood and further advantages will become apparent when reference is made to the following detailed description of the invention and the accompanying drawings in which.

DESCRIPTION OF THE PREFERRED EMBODIMENT

The preferred embodiments of this invention will be better understood by those of skill in the art by reference to the above figures. The preferred embodiments of this invention illustrated in the figures are not intended to be exhaustive or to limit the invention to the precise form disclosed. They are chosen to describe or to best explain the principles of the invention, and its application and practical use to thereby enable others skilled in the art to best utilize the invention.

Figure 1:
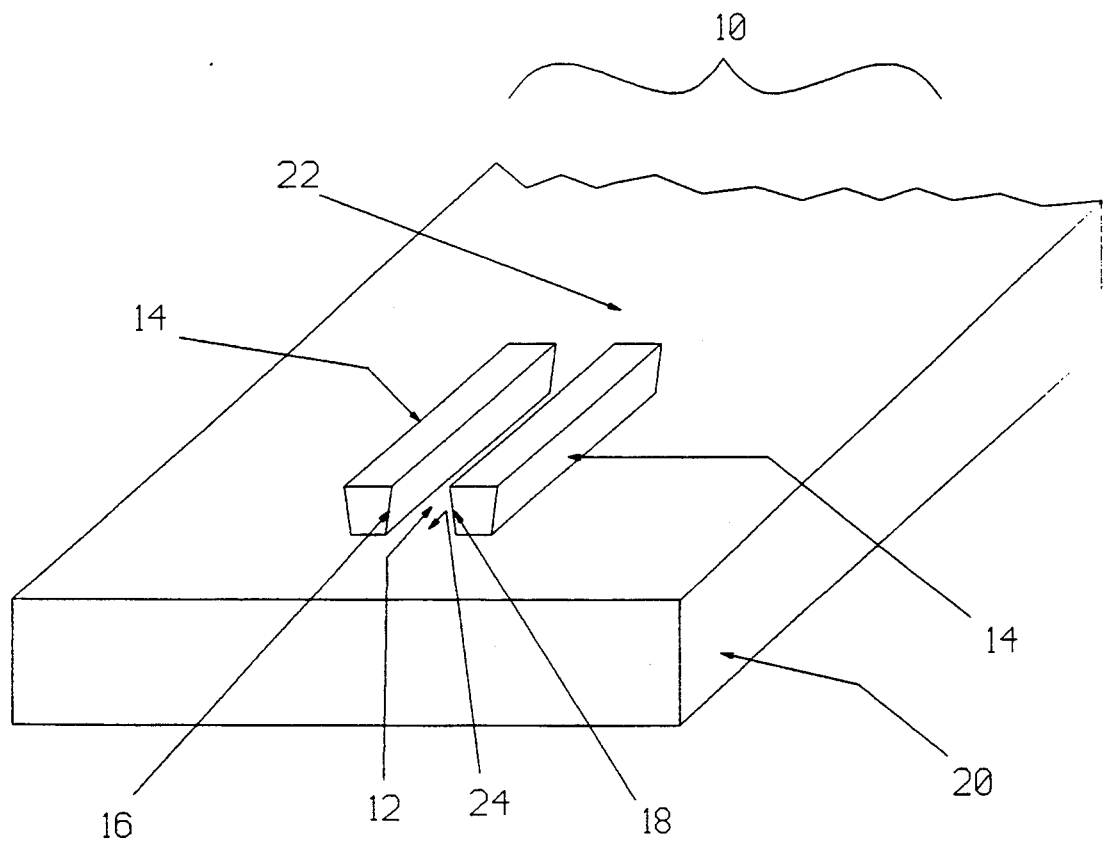
FIG. 1 is a perspective view of a preferred optical coupling device of this invention.

One preferred embodiment of the coupling device of this invention is depicted in FIG. 1 and is identified by the numeral 10. Device 10 comprises channel 12 positioned on a surface of substrate 20. Channel 12 can be of any shape or length provided that it has a certain specific geometric dimensions. Channel 12 can be formed by lithographic techniques using photopolymerizable monomers and the like. Channel 12 can be a single construction or can be formed from a number of parts. In the preferred embodiments of the invention depicted in FIG. 1, channel 12 is formed of lithographic techniques and is formed by a pair of adjacent positioning elements 14 which form sidewalls 16 and 18 of channel 12 and a portion of the surface of substrate 20 which forms floor 24 of channel 12. Channel 12 is positioned on the surface of substrate 20 such that it's longitudinal axis is in alignment or substantially in alignment with predetermined position 22 on the surface of substrate 20.

Substrate 20 can be formed of any solid material used in the formation of substrate for conventional optical waveguide devices. Desired characteristics of these materials include mechanical and optical stability at typical operating temperatures of the device. Preferred materials for use in the fabrication of substrate 20 include printed circuit board material, polymers, quartz, glass, fused silica, semiconductor wafers and inorganic crystals.

Figure 2:
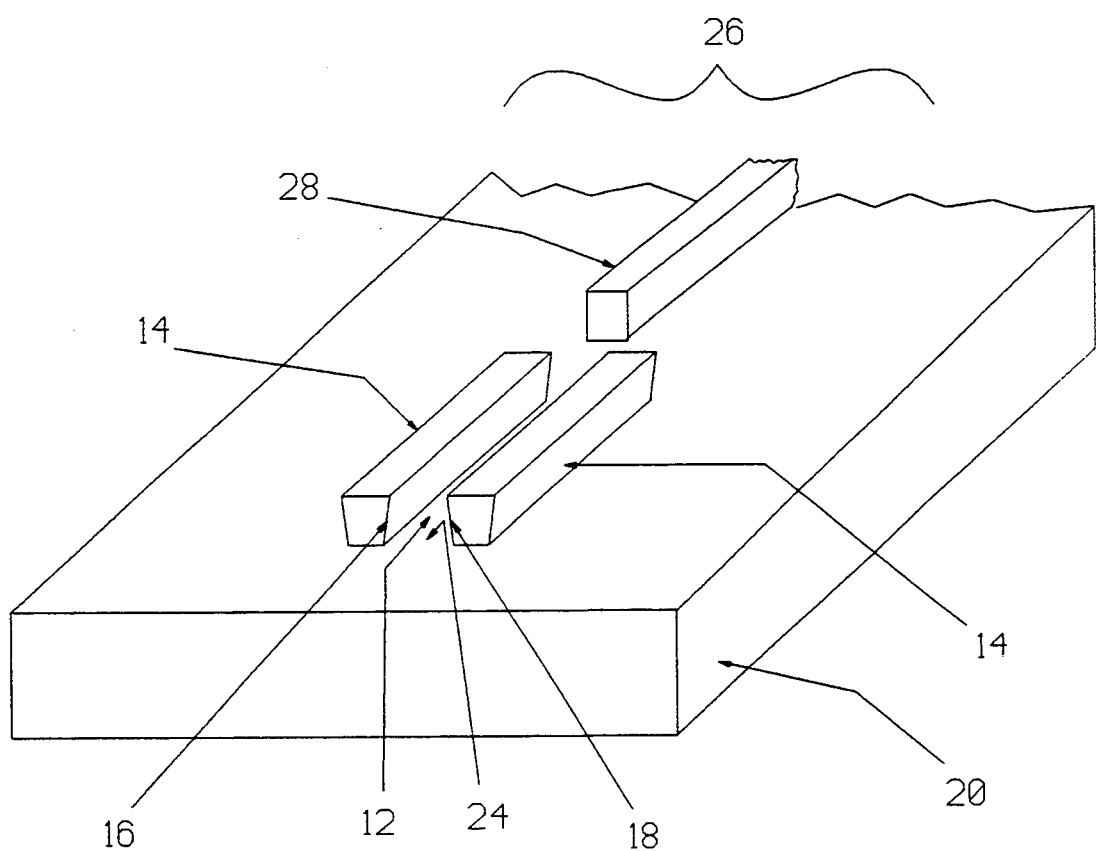
FIG. 2 is a perspective view of an embodiment of a preferred optical coupling device and optical waveguide of this invention.

A preferred coupling and optical waveguide device of this invention is depicted in FIG. 2 and is represented by the numeral 26. Coupling and optical waveguide device 26 comprises polymer positioning elements 14 defining channel 12 on the surface of substrate 20. Device 26 also includes channel waveguide 28 at a predetermined position (which corresponds to position 22 in device 10) on the surface of substrate 20 which is in alignment or substantially in alignment with the longitudinal axis of channel 12.

Figure 3:
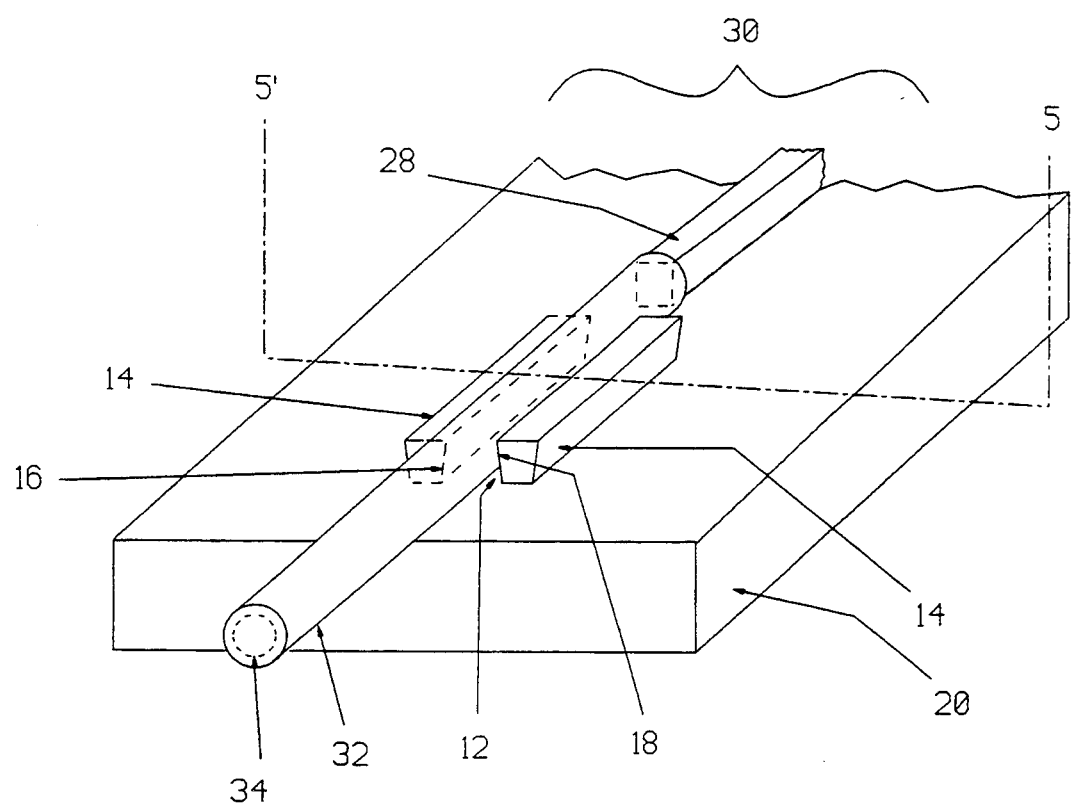
FIG. 3 is perspective view of an embodiment of a preferred optical fiber to optical waveguide interconnect of this invention.

A preferred optical fiber to waveguide interconnect of this invention is depicted in FIG. 3 represented by the number 30. Interconnect 30 comprises polymer positioning elements 14, defining sidewalls 16 and 18 of channel 12, on the surface of substrate 20 and a channel waveguide 28 in alignment or substantially in alignment with the longitudinal axis of channel 12. Interconnect 30 also includes optical fiber 32 positioned in channel 12 such that the light carrying core 34 of optical fiber 32 is in optical alignment or substantially in optical alignment with waveguide 28 such that light can be propagated through light carrying core 34 and into optical channel waveguide 28.

Figure 4:
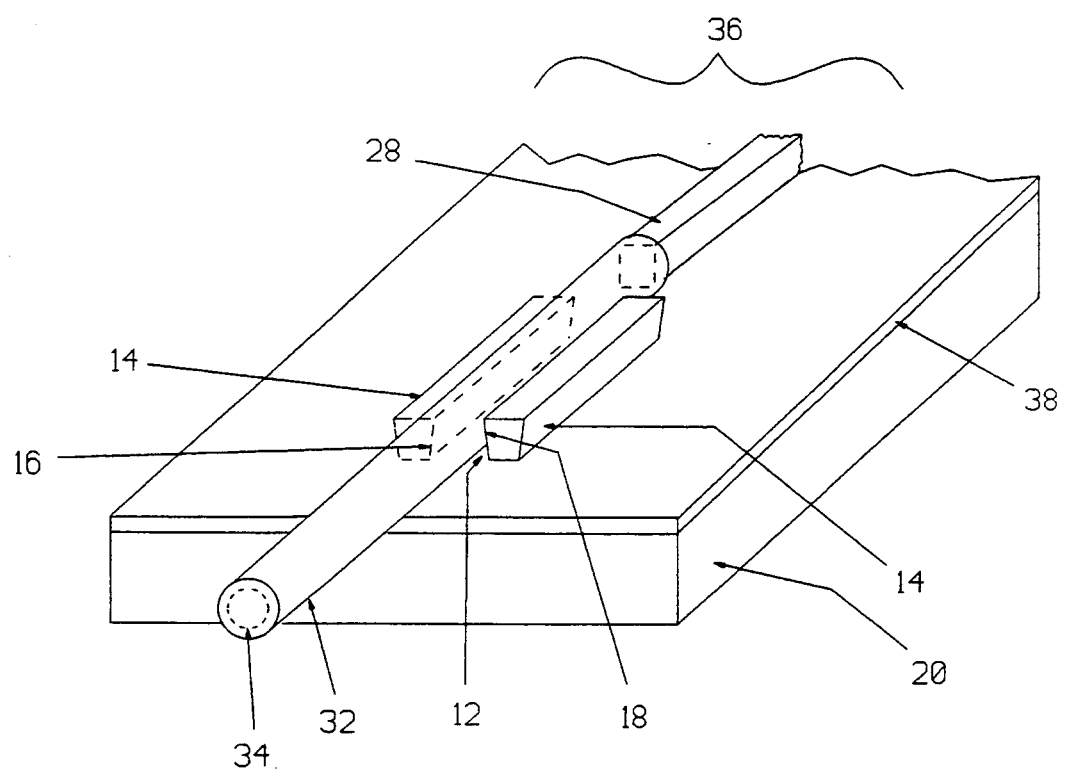
FIG. 4 is a perspective view of the embodiment of FIG. 3 having an optical buffer layer.

Another preferred optical fiber to optical waveguide interconnect of this invention is depicted in FIG. 4 and identified by the numeral 36. Interconnect 36 includes all of the components of interconnect 30 identified by like numerals. In addition, interconnect 36 includes optional optical buffer layer 38 on a surface of substrate 20 and waveguide 28 and elements 14 are positioned on the surface of buffer layer 38. Optical buffer layer 38 is required by the nature of guided wave propagation of light for those cases where the refractive index of the substrate is larger than that of the channel optical waveguide, in order to provide for low propagation loss waveguide structures. Any material which can provide this function can be used in the fabrication of buffer layer 38. Illustrative of materials used in the fabrication of buffer layer 38 are low refractive index photopolymers, spin-coated polymer layers, spin-on glasses, silicon dioxide, oxides formed by chemical vapor deposition (CVD) and fluoropolymers. Preferred materials are low refractive index photopolymers and fluoropolymers, more preferred materials are low refractive index photopolymers.

The relative positions of channel 12 and waveguide 28 or predetermined position 22 on the surface of substrate 20 is critical to the invention. As depicted in FIGS. 1, 2, 3 and 4, channel 12 and waveguide 28 or predetermined position 22 are positioned so that the longitudinal axis of channel 12 and the longitudinal axis of waveguide 28 or position 22 are in alignment or are substantially in alignment such that when optical fiber 32 is placed in channel 12 the light carrying core 34 of the optical fiber 32 and waveguide 28 or predetermined position 22 are in optical alignment or substantially in optical alignment such that light can propagate through core 34 and into waveguide 28. In the preferred embodiments of the invention as depicted in the figures, where channel 12 is formed by sidewalls 16 and 18 of elements 14 and floor 24 of substrate 20, elements 14 are positioned to provide this effect. In the more preferred embodiment of this invention where polymer positioning elements 14 are created by lithographic means from photopolymerizing monomers, elements 14 can be aligned with channel waveguide 28 with a relatively high degree of accuracy. For example, an especially accurate method of alignment is to create polymeric positioning elements 14 and channel optical waveguide 28 from the same polymerizable monomers during the same ultraviolet light (UV) exposure step. This can be accomplished by placing both lithographic features onto the same pattern mask or by programming a laser direct-write apparatus to scan both patterns in a single UV exposure step.

Figure 5:
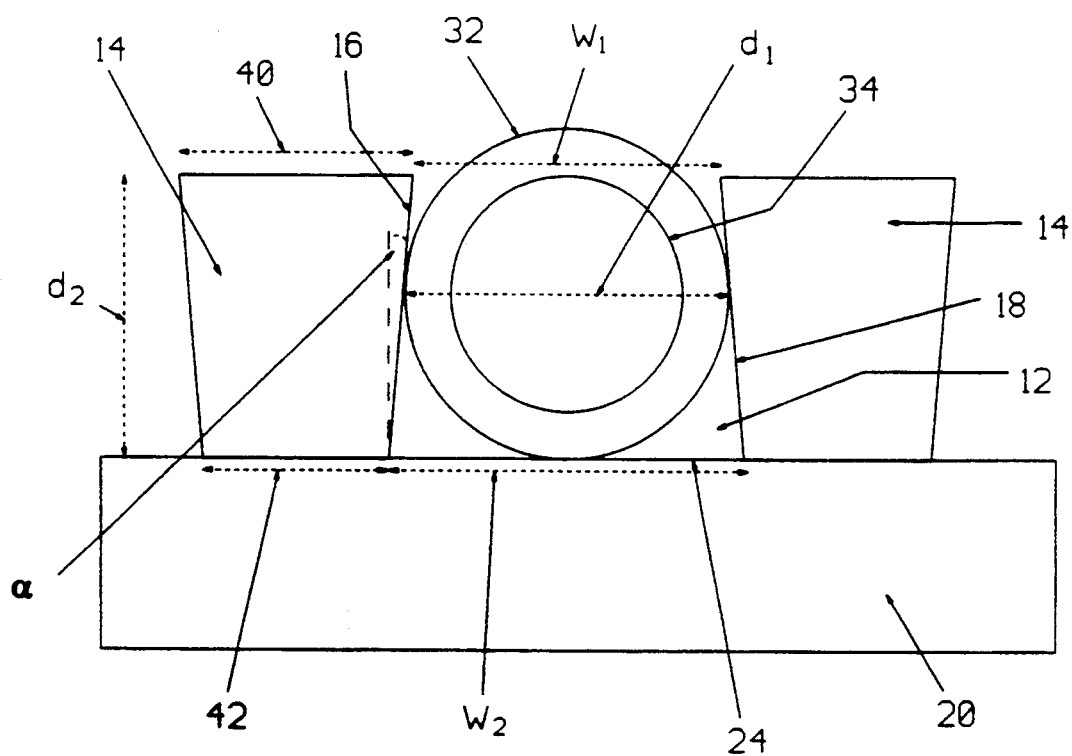
FIG. 5 is a cross-sectional view of a preferred optical fiber to optical waveguide interconnect of this invention depicted in FIG. 3 along line 5'-5.

FIG. 5 is a cross-sectional view, along line 5'-5 of FIG. 3, of interconnect 28 which depicts channel 12, elements 14, sidewalls 16 and 18, optical fiber 32, core 34 and substrate 20 in the requisite unique geometrical relationships that must exist for the proper functioning of the present invention. The relationship of these elements is critical to the advantages of this invention. That is, through use of optical fiber 32 and channel 12 having certain geometrical parameters on placement of fiber 32 in channel 12 such fiber 32 is retained in the channel 12 such that the force required to displace said optical fiber from said channel is equal to or greater than about 0.01 Newton (N), as determined by retaining force test depicted in FIG. 10 discussed below. In general, the cross-section of channel 12 is such that channel 12 has a width dimension of $W_1$ at a region of channel 12 at a depth dimension of $d_2$ from floor 24 of channel 12 in the direction normal to said floor 24 and has a width dimension of $W_2$ at a region of channel 12 adjacent to floor 24 of channel 12. Optical fiber 32 has a diameter $d_1$. To provide the benefits of this invention, the parameters $W_1$, $W_2$, $d_1$, and $d_2$ are selected such that:

(a) $W_2$ is greater than $W_1$;
(b) $d_2$ is greater than $\frac{1}{2} d_1$
(c) $d_1$ is greater than $W_1$ and is equal to or less than $W_2$.

The values of $W_1$, $W_2$, $d_1$, and $d_2$ may vary widely and still meet the above conditions, provided that the coupling of optical fiber 32 in channel 12 is such that the force required to displace optical fiber 32 from channel 12 is equal to or greater than about 0.01 Newton (N), as determined by retaining force test depicted in FIG. 10 discussed below. However, in general the dominating factors are the relative values of $d_1$, $d_2$ and $W_1$. In the preferred embodiments of the invention, $W_1$ is from about 0.6 $d_1$ to about 0.99 $d_1$, more preferably from about 0.8 $d_1$ to about 0.99 $d_1$ and most preferably from about 0.9 $d_1$ to about 0.99 $d_1$. The value of $d_2$ is preferably from greater than $\frac{1}{2} d_1$ to about 2 $d_1$, and is more preferably from about 0.6 $d_1$ to about 0.99 $d_1$ and is most preferably from about 0.8 $d_1$ to about 0.99 $d_1$. In the embodiments of choice, $d_2$ is from about 0.9 $d_1$ to about 0.99 $d_1$. The value of $d_1$ is the diameter of any optical fiber such as conventional single mode fibers, polarization-preserving fibers, multi-mode fiber or cable, UV-NIR transmissive fiber cable and hard polymer clad fiber cable. The value of $d_1$ is preferably equal to or less than 1 mm, more preferably from about 125 $\mu$m to about 1 mm and most preferably from about 125 $\mu$m to about 250 $\mu$m In the embodiments of choice the value of $d_1$ is from about 125 $\mu$m to about 140 $\mu$m.

The value of $W_2$ may vary widely and the only requirement is that $W_2$ is greater than $W_1$ and is greater than or equal to $d_1$. $W_2$ is preferably greater than $d_1$ to about 2 $d_1$, more preferably from about 1.0 $d_1$ to about 1.5 $d_1$ and most preferably from about 1.0 $d_1$ to about 1.2 $d_1$. In the embodiments of choice $W_2$ is from about 1.0 $d_1$ to about 1.1 $d_1$.

The length of channel 12 may vary widely provided that the force required to displace said optical fiber from said channel is equal to or greater than about 0.01 Newton (N), as determined by retaining force test depicted in FIG. 10 discussed below. In the preferred embodiments of this invention, the length of channel 12 is equal to or greater than about $d_1$. The length of channel 12 is more preferably from about 0.1 to about 20 mm and is most preferably from about 0.5 to about 10 min. In the embodiments of choice, the length of Channel 12 is from about 1 to 5 min.

Figure 10:
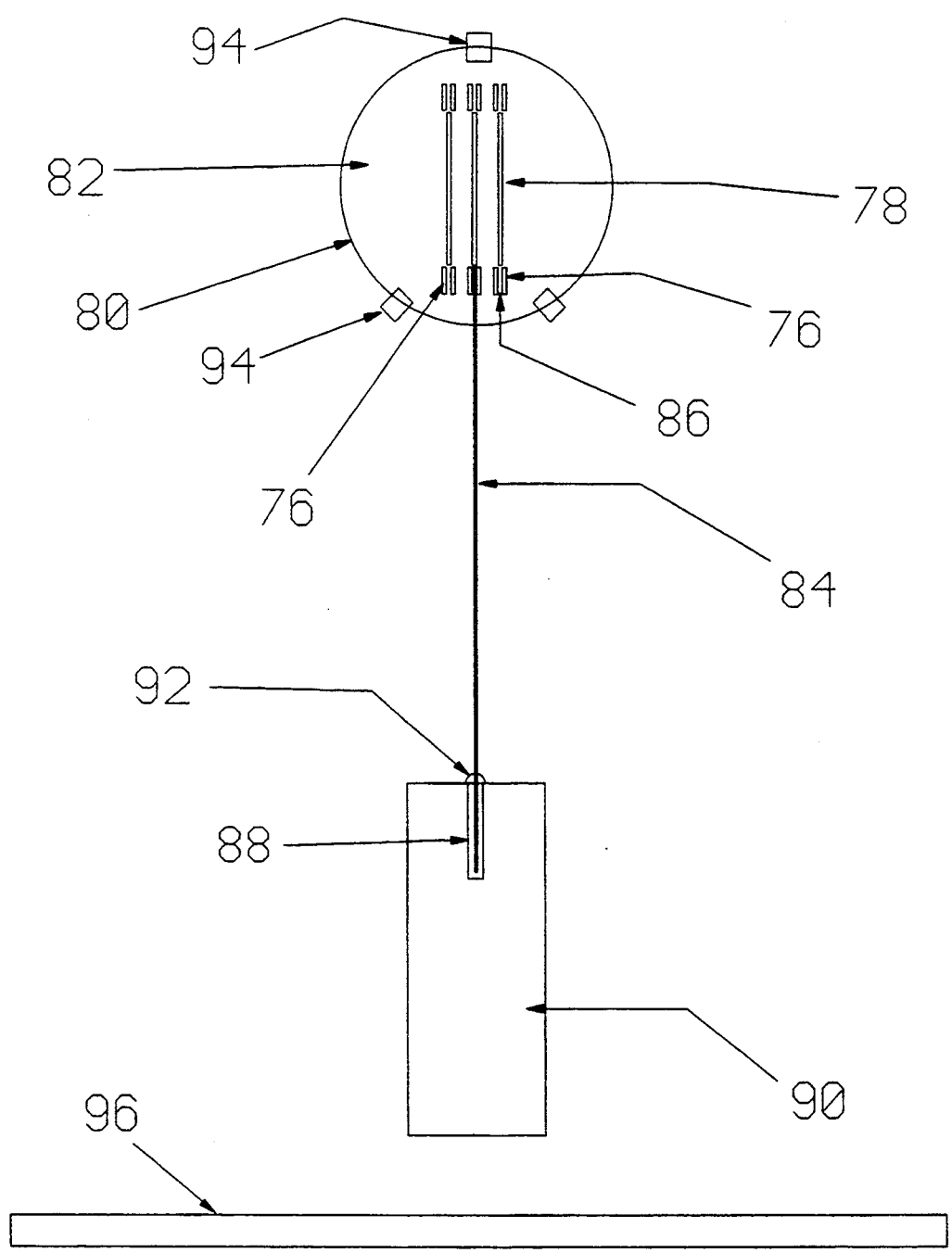
FIG. 10 shows a device for determining the retaining force of the coupling device of this invention.

The cross sectional shape of channel 12 may vary widely and still meet the above conditions, provided that the coupling of optical fiber 32 in channel 12 passes the test of the method of FIG. 10. In FIG. 5, sidewalls 16 and 18 are depicted as being straight, but this is not a necessary requirement of the invention, and sidewalls 16 and 18 may be curved, concave, convex or the like, or one may straight and the other may not, as long as the essential dimensional requirements of the invention are not violated. In the preferred embodiments of the invention depicted in FIGS. 1 to 5, channel 12 is of trapezoidal or substantially of trapezoidal cross-section. In the preferred embodiment of FIG. 5, channel 12 is formed by two parallel or substantially parallel polymer positioning elements 14 on the surface of substrate 20. Channel 12 has sidewalls 16 and 18 formed from a side of each of elements 14 and floor 24 formed by the surface of substrate 20 between elements 14. As shown in FIG. 5, polymer positioning elements 14 define channel 12 which is of inverted trapezoidal cross section having the longer of the two parallel or substantially parallel unequal sides with dimension 40 which is greater than dimension 42 of the other of the two unequal parallel sides, and with the longer of the two parallel unequal sides of dimension 40 positioned on top and the shorter of the unequal parallel sides of dimension 42 positioned in contact with the substrate 20, or the surface of optional buffer layer 38 (See FIG. 4) on substrate 20.

The wall angle which the side of polymer positioning elements 14 makes with the normal to substrate 20 is indicated by the letter $\alpha$. Angle $\alpha$ must be greater than zero if polymer element 14 is to possess the preferred shape of an inverted or substantially inverted trapezoid. If angle $\alpha$ is zero, then the cross section of elements 14 is merely a rectangle as in the prior art and will not possess the unexpected ability to retain the position of an optical fiber 32 in channel 12 created between two such elements 14 such that the coupling passes the test of FIG. 10. The larger that angle $\alpha$ is fabricated the easier it is to maintain optical fiber 32 within channel 12. However, there are practical limitations to how large angle $\alpha$ can be conveniently fabricated. If angle $\alpha$ becomes too large, then the width dimension of polymer element 14 (dimension 40 in FIG. 5) must also become large in order that the base of polymer element 14 (dimension 42 in FIG. 5) has sufficient contact area with substrate 20 to insure relatively good adhesion, and this is deleterious to the density of interconnections that are a primary benefit of this invention. Therefore, wall angles $\alpha$ are preferably limited to the range of from about 1° to about 30°. The more preferred range of wall angles $\alpha$ fall in the range from about 2° to about 25° and most preferred are wall angles in the range of about 3° to about 20°.

Polymer positioning elements 14 possess certain important physical properties. These physical properties allow elements 14 to deform under the applied stress when an optical fiber of diameter $d_1$ larger than width dimension $W_1$ of the opening at the top of channel 12 is inserted therein. However, the deformation should not be permanent and polymer positioning element 14 should as rapidly as possible return or substantially return to its original dimensional shape in order to provide for a useful retaining force on optical fiber 32. The properties must therefore provide some degree of elastic strength. Also the polymer should not be overly brittle or it will be damaged by the insertion, nor can it be overly hard or it may cause damage to optical fiber 32. It is clear why the prior art methods utilizing glass positioning elements are not appropriate from a materials property standpoint. The polymer preferably is a polymer with a molecular weight equal to or greater than about 50,000 and more preferably equal to or greater than 100,000. In the most preferred embodiment of this invention, the polymer material is a photopolymer which is a crosslinked polymer above its gel point, that is, the molecular weight is essentially infinite. The crosslinked photopolymer not only has the most preferred physical properties, but is also the simplest case for removal of the unirradiated monomer as the crosslinked photopolymer will no longer dissolve in the developing solvent when elements 14 are formed by lithographic techniques. The polymer should be largely amorphous (less than 50% crystallinity) rather than crystalline and its glass transition temperature ($T_g$) should be less than its use temperature in order to ensure that there is a high degree of chain segment mobility. It is preferred that the crystallinity of the polymer is less than about 25% and more preferred that the crystallinity is less than about 10%. In the most preferred embodiment the polymer is completely amorphous, that is, the crystallinity is about 0%. A completely amorphous polymer is especially preferred for the embodiment of the present invention wherein a single lithographic step is utilized to produce both polymer positioning elements 14 as well as polymeric optical waveguide 28 from a single layer of reactive monomer on a substrate 20, in that it will yield an optical waveguide with the lowest amount of loss due to scattering of light from polymer crystalline regions. As to the $T_g$, since a useful temperature at which to attach optical fibers to optical waveguide devices is room temperature, it is essential that the $T_g$ of the photopolymer is less than room temperature. Thus, it is preferred that the $T_g$ is less than about 30° C. and more preferred less than about 20° C. and most preferred are photopolymer materials whose $T_g$ is less than 10° C. It is preferred that the $T_g$ of the photopolymer as just described be an inherent property of the polymer. However, it is recognized that it is possible to adjust the $T_g$ of a polymer by a number of methods known in the general art of polymer science, such as by the addition of plasticizers or by swelling the polymer with a solvent, and polymers so treated may also be useful in the method of the invention without departing from its scope. In addition, it is further recognized that unreacted monomer which is trapped within the photopolymer matrix may serve as such a plasticizer material. Further, it is recognized that once the optical fiber is inserted into the channel structure of the invention, it is no longer required that the $T_g$ of the polymer positioning elements fall within the critical range. Such $T_g$ may, at a later time, be adjusted to a higher value as by evaporation of solvent or plasticizer or as by further cross-linking of the polymer. Likewise, though less convenient, a polymer having a $T_g$ greater than room temperature, i.e. above about 30° C., may be employed if the assembly of the device is carried out at elevated temperatures equal to or greater than the $T_g$ of the polymer followed by cooling to a temperature less than the $T_g$. The polymer which makes up positioning element 14 preferably contains a number of crosslinks to prevent overall movement of the polymer chains and thus restore the necessary geometry of element 14 after the introduction of optical fiber 32 into positioning channel 12 between elements 14. This recovery of the shape of polymer element 14 is associated with the properties of resilience and low permanent set. In the preferred case, wherein the polymer material which comprises positioning element 14 is a crosslinked polymer above its gel point, there is, of necessity, a minimum of one primary chemical bond crosslink per polymer chain. In the more preferred compositions at least one of the reactive monomers is a multifunctional monomer, that is, it contains two or more reactive functionalities on the same molecule. When such a multifunctional monomer is present as a major component of the monomer mixture then the resulting polymer will be much more extensively crosslinked and there will be many crosslinks per polymer chain.

The tensile strengths which are displayed by polymers useful in the invention preferably range from about 100 to about 850 kg cm$^{-2}$ with the more preferred range being from about 150 to about 300 kg cm$^{-2}$.

The percent elongation of the crosslinked photopolymers useful in the method of the invention preferably ranges from about 2 to about 300% with the more preferred range being about 2 to about 100% due to the increased level of crosslinking in the more preferred compositions. Useful values of hardness preferably range from about 20 to about 200 s (pendulum hardness) with more preferred values being about 40 to about 150 s.

A wide variety of polymers can be used in the fabrication of elements 14. Preferred for use in the fabrication of elements 14 are photopolymers formed by the photo-polymerization of a photoreactive monomer or mixtures of such monomers such as urethane acrylates and methacrylates, ester acrylates and methacrylates, epoxy acrylates and methacrylates, polyethylene glycol acrylates and methacrylates and vinyl containing organic monomers. Illustrative of such acrylate and methacrylate monomers are aryl diacrylates or methacrylates, triacrylates or methacrylates and tetra acrylates or methacrylates as for example mono-di,-tri- and tetraacrylates or methacrylates of benzene, naphthalene, bisphenol-A, biphenylene, methane biphenylene, di-(trifluoromethyl)methane biphenylene, phenoxyphenylene and the like. Useful monomers also include aliphatic acrylates, diacrylates, triacrylates and tetraacrylates as for example, butyl acrylate, ethylhexyl acrylate, phenoxyethyl acrylate, β-carboxylethyl acrylate, isobornyl acrylate, tetrahydrofurfuryl acrylate, cyclohexyl acrylate, propylene glycol monoacrylate, 2-(2-ethoxyethoxy) ethyl acrylate, N-vinyl pyrrolidone, 1,6-hexanediol diacrylate or dimethacrylate, neopentyl glycol diacrylate, diethylene glycol diacrylate or dimethacrylate, triethylene glycol diacrylate or dimethacrylate, tetraethylene glycol diacrylate or dimethacrylate, polyethylene glycol diacrylate or dimethacrylate, dipropylene glycol diacrylate, tripropylene glycol diacrylate, ethoxylated neopentyl glycol diacrylate, propoxylated neopentyl glycol diacrylate, aliphatic diacrylate, alkoxylated aliphatic diacrylate, aliphatic carbonate diacrylate, trimethylolpropane triacrylate or trimethacrylate, pentaerythritol triacrylate, ethoxylated trimethylolpropane triacrylate, propoxylated trimethylolpropane triacrylate, glyceryl proxylated triacrylate, tris (2-hydroxyethyl) isocyanurate triacrylate, pentaerythritol tetraacrylate, dipentaerythritol pentaacrylate, ditrimethylolpropane tetraacrylate, alkoxylated tetraacrylate. The most preferred monomers include trimethylolpropane triacrylate, pentaerythritol triacrylate, ethoxylated trimethyolpropane triacrylate, glyceryl proxylated triacrylate, pentaerythritol tetraacrylate, dipentaerythritol pentaacrylate, ditrimethylolpropane tetraacrylate, methyl methacrylate, n-butyl acrylate, 2-ethylhexyl acrylate, isodecyl acylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, and pentaerythritol tetra-acrylate.

Especially useful are mixtures wherein at least one monomer is a multifunctional monomer such as a diacrylate or triacrylate, as these will produce a network of crosslinks within the reacted photopolymer. The preferred monomer mixtures for use in the method of the invention are mixture of 33% Genomer T1600 urethane acrylate and 67% 1,6-hexanediol diacrylate; and the mixture of 67% ethoxylated bisphenol A diacrylate and 33% trimethylol propane triacrylate.

Figure 6:
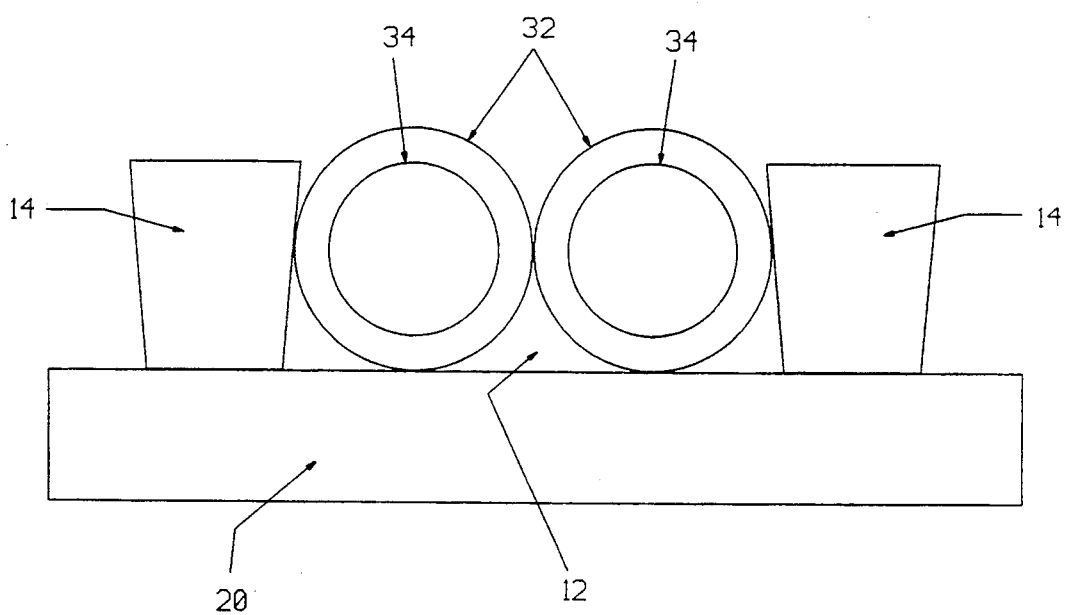
FIG. 6 is a cross-sectional view of another preferred optical fiber to optical waveguide interconnect of this invention having a trapezoidal shaped or substantially trapezoidal shaped channel having two optical fibers positioned therein.

Channel 12 may include a single optical fiber 32 or more than one optical fiber 32 as depicted in FIG. 6. Turning now to FIG. 6, which is a cross sectional view through the region of the polymeric positioning elements 14 on a suitable substrate 20. In the following embodiment, elements 14 are positioned such that two optical fibers 32 are accommodated in the channel 12 which is formed between elements 14 such that the light carrying core 34 of each optical fiber 32 is in optical alignment or substantially in optical alignment with a waveguide (not depicted). This also is an embodiment of the present invention whereby the density of optical waveguides can be increased or the length and area of the fan-in and fan-out regions can be reduced. The retaining force on optical fibers 32 is not as great as the embodiment where only a single optical fiber occupies a positioning channel, yet it is still sufficient to allow for increased utility in attaching optical fibers to optical waveguides on substrates over the methods of the prior art.

Figure 7:
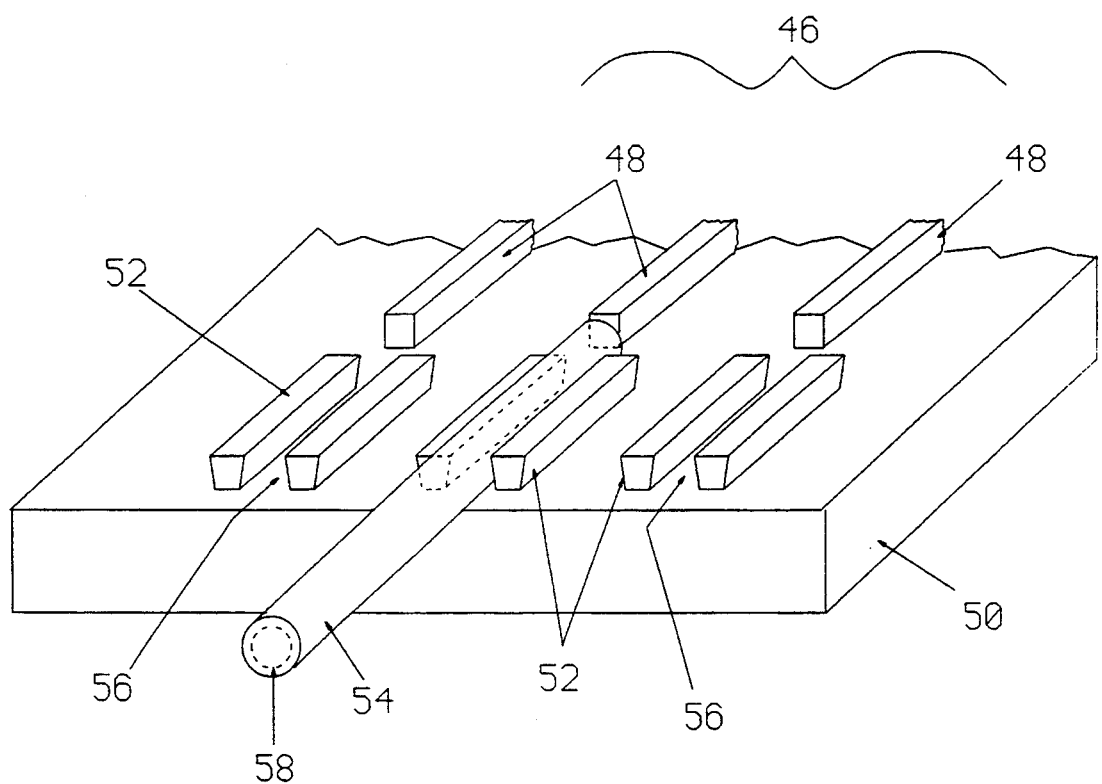
FIG. 7 is a perspective view of an array of this invention with more than one optical coupling devices and optical fiber to optical waveguide interconnected on the surface of a substrate.

A preferred array of this invention is shown in FIG. 7 and is represented by numeral 46. Turning now to FIG. 7, in the following embodiment, an array of optical waveguides 48 on a single substrate 50 is provided with an aligned array of the polymeric positioning elements 52 of the present invention. Each pair of elements 52 is centered on, and parallel to, the centerline of the end of optical waveguide 48 with which it is associated, the alignment preferably being accomplished by known methods of the art as for example by lithography, such as by utilizing exposure masks which also contain registration marks thereon. The end of optical fiber 54 is shown to be inserted into one of the channels 56 formed by polymer positioning elements 52 such that it light carrying core 58 of fiber 54 is aligned and centered on the end of optical waveguide 48. Optical fiber 54 is held firmly in the channel by the retaining force exerted upon it by the polymer positioning elements which have the required geometry as in FIGS. 1 to 5, without the necessity of additional elements or optical glues or melting. This firm positioning allows additional optical fibers 54 to be placed in nearby channels 56 without disturbing the positioning of optical fiber 54 which is already in place. This provides for a greatly increased ease of fabrication for attaching optical fibers 54 to optical waveguides 48 over the methods of the prior art, Also provided is the ability to introduce each optical fiber in an array individually, thus overcoming the cumulative positioning error associated with prior art methods wherein the entire optical fiber array is loaded simultaneously.

Figure 8:
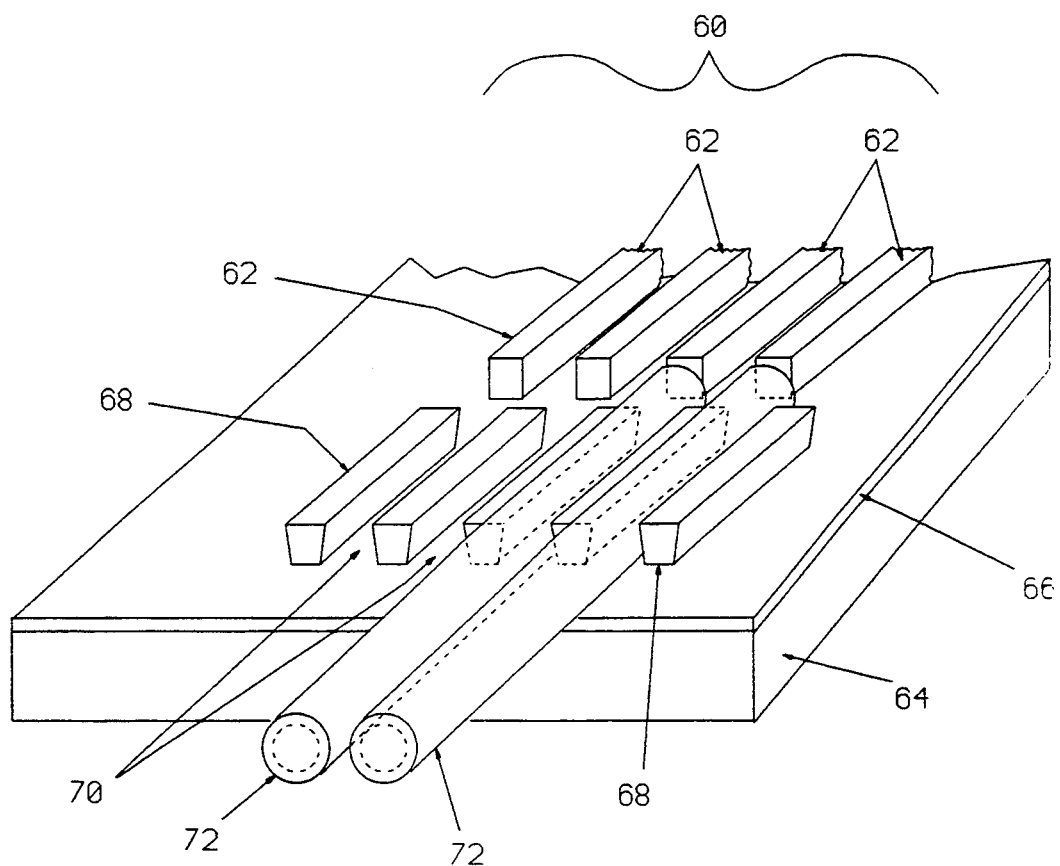
FIG. 8 is a perspective view of another preferred array of this invention.

Another preferred array of this invention is depicted in FIG. 8 and is represented by the numeral 60. Turning now to FIG. 8, in embodiment 60 depicted therein an array of optical waveguides 62 on a single substrate 64 with an optional optical buffer layer 66 is provided with an aligned array of polymeric positioning elements 68 such that the positioning elements 68 which are not the outermost form the sidewall of two adjacent channels 70. That is, the central polymer positioning elements 68 are shared by two optical waveguides 62. Thus, if the number of optical fibers 72 to be attached is n, then the number of required polymer positioning elements 68 is n+1. In this manner it is possible to reduce the separation between adjacent optical waveguides 62 on substrate 64 and thereby either increase the density of optical waveguides 62 or reduce the size of the fan-in and fan-out region of a multi-port optical waveguide device known to those skilled in the art.

Figure 9:
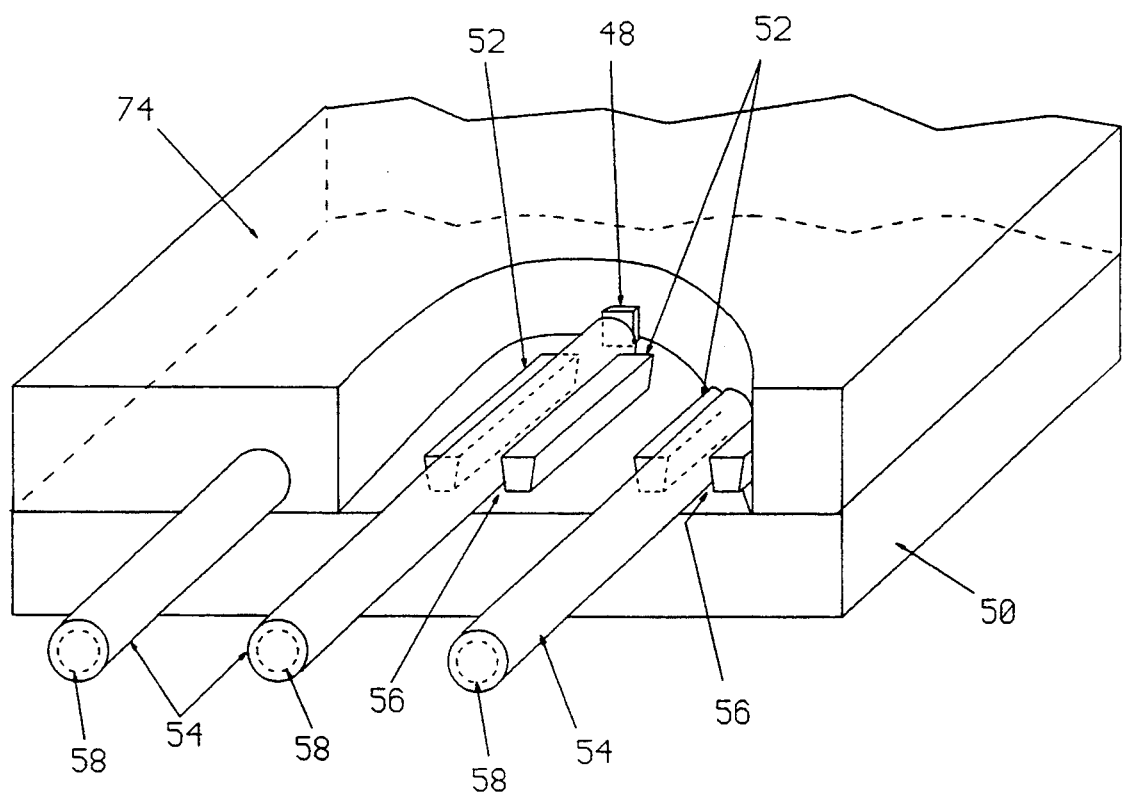
FIG. 9 is a perspective view with a cutaway section of a packaged optical fiber to optical interconnect of the invention similar to that of FIG. 3, but including a polymeric overcoat.

An optical fiber to waveguide interconnect of this invention or an array of such interconnects as depicted in FIGS. 1 to 8 can be fabricated with an overcoat layer as depicted in FIG. 9. Turning now to FIG. 9, which is a perspective view with a cutaway section through the region of polymeric positioning elements 52, of the embodiment, similar to that of FIG. 7. Polymer positioning elements 52 are lithographically formed by a photopolymerization process on the surface of substrate 50 which may optionally also bear an optical buffer layer (not shown) so as to provide a channel structure 56 of the required geometry. Channel 56 provides both alignment positioning and retaining force to optical fiber 54 such that the light carrying core 58 of the optical fiber 54 is held in contact with the end of optical channel waveguide 48 on the surface of substrate 50. Polymer positioning elements 52 serve to hold optical fiber 54 in position while an overcoat material layer 74 is applied to the structure. Layer 74 serves to protect the optical waveguide structure from physical damage or dust and also serves as a means of adjusting the numerical aperture (N.A.) of channel optical waveguide 48 so as to match the numerical aperture of optical fiber 54 and thereby reduce the optical losses due to numerical aperture mismatch. Such an overcoat layer 74 may comprise an optical cement, a reactive monomer mixture which is cured to a polymer as by thermal or photo polymerization, a glass precursor which is cured to a glass, or a plastic or glass which is applied by a solution technique followed by drying. Polymer positioning elements 52 of the present invention maintain the positioning of optical fiber 54 by the retaining force imposed by the unique geometry of elements 52 such that optical fiber 54 is not displaced during the overcoating process, thus overcoming the drawbacks of the prior art methods. Specifically, optical fiber 54 is not "floated" in channel 56 by the force of capillary action of the overcoating liquid, but is held down in contact with substrate 50 by the retaining force generated by the unique geometry of elements 52. The methods of the prior art require additional elements to apply the force necessary to maintain the position of the optical fibers during such an overcoating process.

FIG. 10 depicts a test method which illustrates the retaining force polymer positioning elements 14 provide upon optical fibers which are inserted therein and for evaluating such force. In the preferred embodiments of the test depicted in FIG. 10, an array of polymer positioning elements 76 and polymer optical waveguides 78 are printed by a process of mask irradiation of a reactive monomer mixture onto the surface of a silicon wafer substrate 80 bearing a thin layer of an optical buffer 82. Glass optical fiber 84 is inserted into one of the channels 86 formed by a pair of polymer positioning elements 76 such that it is held in alignment with optical waveguide 78. No glues or additional elements are present to increase the retaining force on optical fiber 84, which is held in place solely by the retaining force of polymer positioning elements 76. The other end of optical fiber 84 is inserted into a hole 88 which is drilled into the end of an aluminum block 90, which has a mass of 1 grams, preferably 10 grams, even more preferably 50 grams, more preferably 75 grams and most preferably 100 grams, and is secured in the hole 88 by several drops of epoxy glue 92. A block having a mass of 1 gram will exert a force of 0.01 Newton on the coupling of optical fiber 84 and elements 76, a block having a mass of 10 grams will exert a force of 0.1 Newton on the coupling of optical fiber 84 and elements 76, a block having a mass of 50 grams will exert a force of 0.5 Newton on the coupling of optical fiber 84 and elements 76, a block having a mass of 75 grams will exert a force of 0.75 Newton on the coupling of optical fiber 84 and elements 76, and a block having a mass of 100 grams will exert a force of 1.0 Newton on the coupling of optical fiber 84 and elements 76. The silicon wafer substrate 80 is placed in clamp 94 and suspended such that the aluminum block is lifted clear of the table top 96. Block 90 is allowed to hang from wafer 80, held solely by the retaining force generated by the interaction of polymer positioning elements 76 (preferably about 5 mm long) with optical fiber 84 for a period of one hour without any noticeable change in the position of optical fiber 84 relative to optical waveguide 78. This method demonstrates the unexpected stability of optical fiber 84 to optical waveguide 78 coupling which is provided by the channel of this invention having unique geometry which the methods of the prior art do not provide unless additional elements or cements are present.

Figure 11:
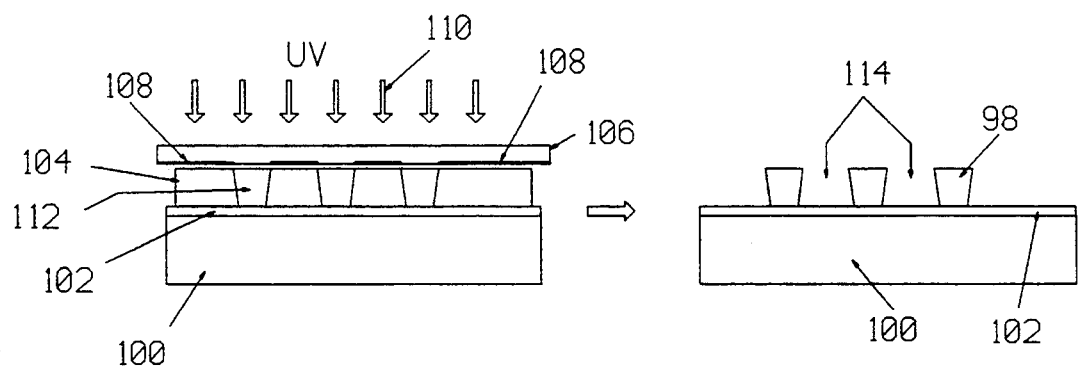
FIG. 11 illustrates a preferred process for the formation of a coupling device of the present invention.
Figure 12:
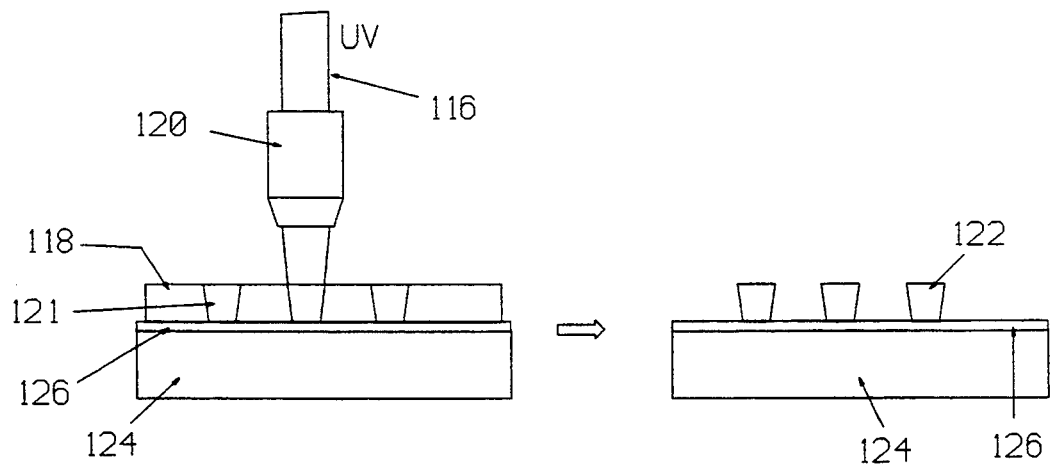
FIG. 12 illustrates another preferred process for the formation of a coupling device of the present invention.

FIGS. 11 and 12 illustrate the method of the present invention by which polymer positioning elements of the required unique geometry are provided. In FIG. 11 is detailed a method whereby polymer elements 98 are provided by a pattern of mask irradiation with UV light. Substrate 100 which may optionally be coated with a layer of optical buffer material 102 is coated with layer of photoreactive monomer layer 104 to a thickness which is greater than the radius ($\frac{1}{2} d_1$) of the optical fiber which is to be coupled to the optical waveguide. Image mask 106 bearing a pattern of opaque areas 108 which allow UV light 110 to pass through only in the areas which comprise the pattern of polymer positioning elements 112, and optionally the pattern of channel waveguide elements (not depicted), is positioned above monomer layer 104 in close proximity, and UV light 110 as for example from a mercury or xenon lamp, is directed to fall on the surface of image mask 106. UV light 110 which passes through the clear areas of mask 106 causes a photopolymerization reaction in the regions 112 of monomer layer 104 which are directly under those image areas. No photoreaction occurs in those areas of monomer layer 104 which are shielded from the UV light by the opaque areas 108 of image mask 106. After irradiation by UV light, image mask 106 is removed and the unreacted monomer is washed away with a suitable solvent such as acetone or methanol, leaving a pattern of photopolymerized structures on substrate 100 which correspond to polymer positioning elements 98 of the present invention which define channels 114 having the preferred trapezoidal or substantially trapezoidal cross section having the required geometry to pass the test of FIG. 10. The simplicity and ease of photodelineation of polymer structures and the great alignment accuracy which is possible with lithographic methods in general, allows the method of the present invention to overcome many of the drawbacks of the methods of the prior art. The unique geometry of polymer positioning elements 98, that being an inverted trapezoid as shown on the right hand side of FIG. 11, is achieved by the choice of proper conditions of irradiation. The optical absorption of the unreacted monomer layer 104 at the wavelengths of the UV light must be high enough, such that a gradient of UV light intensity is established through the film. That is, the amount of UV light available in the monomer layer to cause the initiation of the photoreaction will decrease from the top, or the image mask side, towards the bottom, or the substrate side, due to the finite absorption of the monomer layer. This gradient of UV light causes a gradient in the amount of photopolymerization reaction that occurs from top to bottom, and this results in the unique geometry of the developed polymer structure, a geometry which is easily accessible with the method of the present invention, but not easily attained with the methods of the prior art. The gradient in the amount of photopolymerization which occurs from the top to the bottom of the film may be further influenced by the presence of dissolved oxygen gas in the monomer layer, such oxygen acting to curtail or quench the photopolymerization reaction except in those areas where all oxygen has been consumed by the free radicals produced in the photopolymerization process. Such action of dissolved oxygen gas on the progress of photopolymerization reactions is well known to those skilled in the art. Further, the requisite geometry of the photopolymer structures may be further influenced by the process of self-focusing. That is, the light falling on the surface of the monomer layer 104 initiates photopolymerization at that surface, and since the refractive index of the solidified polymer material is higher than that of the liquid monomer, it acts to refract the light passing through it. In this manner the aerial image of light falling on the monomer nearer to the substrate side of the monomer layer is altered through refraction caused by the already-polymerized material which lies above it. This effect may cause a narrowing of the resultant polymerized structure from the top surface, upon which the imaging light was directed, towards the bottom, or substrate side of the layer.

In FIG. 12, a UV laser beam 116 is focused onto the surface of the monomer layer 118 with a focusing optical element 120, such as a quartz microscope objective, and the photopolymerized sections 121 are provided by scanning the focused laser spot on the surface of monomer layer 118 in a pattern corresponding to the polymer positioning elements 122, and optionally in the pattern of an optical waveguide device (not depicted). After the exposure is complete, the unexposed monomers are rinsed from substrate 124 by a suitable solvent such as acetone or methanol to yield polymer positioning elements 122 having the desired geometry on the surface of substrate 124, which may optionally carry a layer of optical buffer 126. In the case of the method of FIG. 12, the required unique geometry of polymer positioning elements 122 is provided by the same process of optical gradient within monomer layer 118, but is also further enhanced by the focal properties of focusing optical element 120, which converts the parallel beam of the laser into a focused cone of light which intersects the monomer layer with a cross section that has the desired inverted trapezoid geometry. The influences of dissolved oxygen and self-focusing on the resulting geometry of the fabricated photopolymer elements may also be considerable in the case of scanning laser exposure.

Photoreactive monomer layers 104 and 118 comprise a photopolymerizable monomer or a mixture of such monomers and one or more photoinitiators and optionally one or more stabilizers. Useful monomers include those described above for use in the formation of positioning elements such as methyl methacrylate, n-butyl acrylate, 2-ethylhexyl acrylate, isodecyl acylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, trimethylolpropane triacrylate, pentaerythritol triacrylate and pentaerythritol tetra-acrylate and mixture thereof. Especially useful are mixtures wherein at least one monomer is a multifunctional monomer such as a diacrylate or triacrylate, as these will produce a network of crosslinks within the reacted photopolymer, such as a mixture of Genomer T1600 urethane acrylate and 1,6-hexanediol diacrylate or a mixture of ethoxylated bisphenol A diacrylate and trimethylolpropane triacrylate.

A wide variety of photoinitiators are suitable for use in initiating polymerization by UV light in the monomer mixtures. Many good descriptions of useful initiators for photopolymer systems are available in the art including *Photopolymerization of Surface Coatings*, chapter 3 (1982) by C. G. Roffey. Preferred photoinitiators are those which are soluble in the preferred monomers and which have useful absorption at the wavelengths of light chosen for irradiation. If the necessary unique geometry of the photopolymer element is to be provided by the establishment of a gradient of photoinitiation events through the thickness of the monomer layer, then it is important that the layer has significant optical absorption at the irradiating wavelength. If the optical absorption of the constituent monomers is small at these wavelengths the requisite absorption may be provided by the photoinitiator. Combinations of several photoinitators are useful to broaden wavelength sensitivity or to increase loading solubility or to match the photospeed of the monomer system to the particular light source to be employed. Especially useful photoinitiators in the method of the invention include 2-hydroxy-2-methyl-1-phenyl-propan-1-one (Darocur 1173), 2,2-dimethoxy-2-phenylacetophenone (Irgacure 651) and 1-hydroxycyclohexyl phenyl ketone sensitized 1:1 with benzophenone (Irgacure 500). An especially preferred mixture of photoinitiators is a 1:1:1 mixture of these three sensitizers.

The amount of initiator which is useful in the photomonomer mixtures is dependent on the desired photo speed at the available optical power present in the source of irradiation and on the desired wall angle and thickness of the polymeric positioning element. In general, less initiator is required for a high brightness, focused source such as a scanned laser beam and more is required for a low brightness source such as a mercury lamp which has been spread out to cover a large area such as a printed circuit board. Useful loadings of photoinitiators, by percent weight of the total monomer mixture layer, are 0.1 to 10% with a preferred range of 0.5 to 8% and a most preferred range of 2 to 6%.

The following examples are intended to further teach the utility of the invention. The scope of the invention is not limited by the examples, as other uses within the scope of the invention will be evident to those skilled in the art. The invention is limited only by the appended claims.

EXAMPLE 1

A silicon wafer was spin coated at 6000 rpm with a photocurable fluoromonomer mixture [80 parts F8 perfluoropolyether diol diacrylate, 108 parts F40 perfluoropolyether diol diacrylate, 6 parts hexafluoroisobutylene/vinyl alcohol copolymer, 3 parts Irgacure 500 and 3 parts Darocure 1173] which was then cured under a 1000 Watt xenon lamp for 1 minute under a nitrogen atmosphere to provide a 4 micron thick optical buffer layer. The wafer was baked for 10 minutes at 120 C., followed by a 30 second oxygen reactive ion etch (RIE) to improve adhesion of the subsequent waveguide layer. The substrate was spread with a 180 micron thick layer of photocurable acrylate monomer mixture [50 parts Genomer T1600 urethane acrylate, 98 parts 1,6-hexanediol diacrylate, 1 part Darocure 1173, 1 part Irgacure 651 and 1 part Irgacure 500]. The substrate was placed on a computer controlled positioning stage under the focused beam of a UV argon laser. The computer was programmed to move the sample under the laser beam so as to expose only discrete areas of the sample in the design of a 3×1 channel waveguide combiner, with individual pairs of polymer positioning elements at the end of each of the 4 ports of the waveguide device. After the selective pattern exposure was complete, the substrate was rinsed in acetone to wash away the unreacted monomer from all areas not exposed to the laser irradiation. The result was a rib waveguide 3×1 combiner on a semiconductor substrate with precisely aligned polymer positioning elements to facilitate the attachment of fiber optic "pigtails". The polymer positioning elements were delineated so that a bare glass fiber of diameter 140 micron would be tightly held in the channel formed between them.

EXAMPLE 2

The waveguide device of Example 1 was placed under a dissection microscope to magnify the waveguide termination area. Bare glass optical fiber strands were hand-inserted into the channels formed by the polymer positioning elements. It was immediately noted that, once inserted, the glass optical fibers were held very tightly by the polymeric positioning elements. It was therefore quite easy to successively pigtail each of the four waveguide ports without disturbing any of the previously inserted optical fibers.

EXAMPLE 3

The pigtailed device of Example 2 was clamped down under a CCD camera so that the fiber termination area could be observed on a TV screen. The optical fiber pigtail was held by an XYZ positioning stage so that it could be moved relative to the waveguide substrate. The positioning stage was used to translate the optical fiber in both the in-plane and out-of-plane directions. It was possible to cause a large bend in the optical fiber in either direction without inducing the optical fiber to come out of the polymer positioning elements.

EXAMPLE 4

A pigtailed sample was prepared as in Examples 1 and 2, except in this case the non-fluorinated acrylate monomer mixture of Example 1 was utilized to form the optical buffer layer and a higher index acrylated monomer mixture [96 parts ethoxylated bisphenol A diacrylate, 33 parts trimethylolpropane triacrylate, 3 parts Irganox 1010 antioxidant, 1 part Darocure 1173, 1 part Irgacure 651 and 1 part Irgacure 500] was used to form the optical waveguides and the polymer positioning elements. No reactive ion etching was used. After the glass optical fiber pigtails were in place, the entire structure was overcoated with a thick layer of the lower index acrylate monomer mixture, which was then UV exposed to polymerize it. The result was a device which was fully encapsulated by a polymer layer to protect it from dirt and physical damage. The polymer positioning elements were capable of maintaining the alignment of the glass optical fibers to the ends of the optical waveguide device during the overcoating process without the need for additional retaining elements.

EXAMPLE 5

A 3×1 combiner was produced as in Example 4 except that the substrate was polyimide laminate circuit board material rather than a silicon wafer.

EXAMPLE 6

A chrome on glass photomask was produced which contained a pattern of straight line optical waveguides with sets of polymer positioning elements of length 5 mm at each end. The mask was brought into contact with a 125 micron thick layer of the high index photocurable monomer mixture of example 4 on a silicon substrate bearing a thin layer of the photocured low index optical buffer of example 4. The sandwich structure of substrate, photocurable monomer and image mask was placed under the collimated output of a 1000 Watt xenon lamp fitted with UV reflecting optics. The monomer was exposed for 12 seconds, after which the mask was removed and the unexposed regions were rinsed away with acetone. The straight optical waveguides and polymer positioning elements remained on the optically buffered silicon substrate. A length of glass optical fiber was inserted into the channel formed by one pair of the polymer positioning elements so that it was aligned with the polymer waveguide. The other end of the optical fiber was epoxied to an aluminum weight weighing 110 grams. After the epoxy dried, the wafer bearing the waveguide was hung vertically so that the weight was suspended solely by the gripping action of the polymer positioning elements. The interaction length between the optical fiber and the polymer positioning elements was only 5 mm and no type of glue or epoxy was present in this region. The weight was allowed to hang from the waveguide substrate for several months and no displacement of the optical fiber occurred.

EXAMPLE 7

An optical waveguide with pairs of polymer positioning elements at each end was prepared with an image mask exposure as in Example 6, except that the substrate was a polyimide laminate circuit board material rather than a silicon wafer.

EXAMPLE 8

Example 4 was repeated except that two polymer optical waveguides were written with a 40 micron separation and the polymer positioning elements were laser written with a separation slightly less than twice the diameter of the glass optical fiber. Two bare optical fiber pigtails were placed in the channel between the polymer positioning elements at each end of the optical waveguides, for a total of four pigtails. The polymer positioning elements were capable of maintaining the alignment of each of the optical fibers to its respective waveguide during the overcoating process.

EXAMPLE 9

Polymer positioning elements were prepared on silicon substrates by both the focused laser writing process of example 1 and the masked irradiation process of example 6. The crystalline silicon wafers were then cleave fractured perpendicular to the polymer positioning elements so as to provide a cross section of the elements. The cross-sections of the cleaved polymer positioning elements were then examined by optical and scanning electron microscopy. The structure of the polymer elements was observed to have the requisite geometrical shape of a preferred embodiment of the present invention, that being inverted trapezoids with the longer of the two unequal parallel sides located on top and the shorter of the unequal parallel sides located adjacent to the silicon wafer substrate. The resulting shape of the channel between two such structures in proximity was also of the required geometry of the present invention, that being a channel with a smaller opening at the top and a larger separation at the substrate. The shape of the channel could also be described as a trapezoid with the longer of its two parallel unequal sides adjacent to the substrate. The width of the channel separation at the top was less than the 140 micron diameter of a suitable glass optical fiber, while the bottom separation dimension was adequate to accommodate such an optical fiber dimension.

EXAMPLE 10

A substrate comprising a sheet of Lexan polycarbonate was spin coated with a thin layer of the optical buffer material of Example 4 and exposed to a xenon lamp for 10 seconds to cure. The substrate was then coated with a 20 micron thick layer of a reactive monomer mixture comprising [56 parts ethoxylated bisphenol A diacrylate, 19 parts trimethylol propane triacrylate, 21 parts Genomer T1600 urethane acrylate, 41 parts 1,6-hexanediol diacrylate, 1.7 parts Irganox 1010 antioxidant, 1 part Darocure 1173, 1 part Irgacure 651, 1 part Irgacure 500]. The focused UV laser apparatus of Example 1 was used to write a pattern consisting of a rectangular plateau which was then developed by rinsing with methanol. The substrate bearing the plateau structure was then coated with a 120 micron thick layer of the high index monomer mixture of Example 4 and the same focused UV laser apparatus was used to write a pattern corresponding to a straight channel waveguide with pairs of polymer positioning elements at each end. The channel waveguide was the same length as the plateau feature and was positioned such that the waveguide was on top of the plateau and the ends of each were coincident. The polymer positioning elements were therefore placed just beyond the edge of the plateau. The exposed structure was rinsed free of unreacted monomer with methanol to provide a channel optical waveguide on a 20 micron plateau with a pair of polymer positioning elements centered on each end of the waveguide, but positioned just beyond the edge of the rectangular plateau. The channel structure formed by each pair of polymer positioning elements was pigtailed with a glass optical fiber of diameter 140 microns and core diameter of 100 microns. In this manner, the optical fiber was precisely aligned with the optical waveguide and the plateau region served as an offset, so that the lowest portion of the optical fiber core was precisely located with the bottom of the optical waveguide, thus providing excellent vertical and horizontal alignment. The pigtailed waveguide structure was overcoated with the same monomer mixture which comprised the plateau structure and the mixture was photocured for 1 minute under a xenon lamp. The refractive indexes of the cured waveguide material and the cured overcoat material were chosen such that the numerical apertures of the waveguide and the optical fiber were matched.

EXAMPLE 11

Example 10 was repeated except the substrate was a polyimide circuit board material and the unexposed monomer was removed with an acetone rinse.

EXAMPLE 12

Example 11 was repeated except that a chrome on glass photomask and a xenon lamp were used in place of the focused UV laser to print both the rectangular plateau features and the optical waveguides with polymer positioning elements.

COMPARATIVE EXAMPLE

A chrome photomask was prepared with patterns of straight channel optical waveguides terminated with pairs of positioning elements. The pairs of positioning elements were centered on the midline on the straight optical waveguides sections and there was a separation of 240 microns between the centerlines of the positioning elements. The widths of the positioning elements was varied from 90 to 110 microns in 5 micron increments such that the width of the channel formed between each pair of elements ranged from 150 to 130 microns. This pattern was printed by lithographic exposure as in Example 6 to form polymer channel waveguides with associated polymer positioning elements, where the width of the top of the channel formed between such elements was varied from 150 to 130 microns (where this separation width is equivalent to dimension $W_1$ of FIG. 5). Glass optical fibers of diameter 140 microns were then inserted into each channel in alignment with the polymer optical waveguides. Referring to FIG. 5, this represents the cases where dimension $W_1$, the separation between the positioning elements at the top of the channel, ranges from less than the optical fiber diameter to greater than the optical fiber diameter. Upon inserting the fibers into the channel and subjecting them to very small disturbances, such as lifting the substrate and allowing the weight of the fibers to hang on the union it was observed that those channels with top separations of 145 and 150 microns failed to retain the fiber in contact with the end of the channel waveguide. The channel with a top separation 140 microns was able to hold the fiber position for very small disturbances, but failed if the force on the fiber was increased. The channels with top separations of 135 and 130 micron, (smaller than the optical fiber diameter) provided for a very robust union of optical fiber to optical channel waveguide, and were not disturbed even if small weights were suspended from the optical fiber. The channel with 135 micron top separation was preferred as it provided a secure union, but required less force on the optical fiber during insertion. Thus, those positioning elements that do not possess the necessary geometry of the invention, that is, those whose top separation dimension is greater than the diameter of the optical fiber to be inserted, do not provide for the desirable properties of the present invention, those being secure and accurate positioning of optical fibers to optical waveguides.

What is claimed is:

1. An optical coupling device with an optical waveguide comprising:
    a substrate;
    an optically transmissive waveguide on a surface of said substrate; and
    a polymer channel on the surface of said substrate for optically aligning and coupling an optical fiber having a diameter dimension $d_1$ and said optical waveguide, wherein the longitudinal axis of said channel is in alignment or substantially in alignment with said waveguide such that on placement of said optical fiber in said channel the light carrying core of said fiber and said waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:
    (a) $W_2$ is greater than $W_1$;
    (b) $d_2$ is greater than $\frac{1}{2} d_1$; and
    (c) $d_1$ is greater than $W_1$ and is equal to or less than $W_2$,
wherein on placement of said optical fiber in said channel the force required to displace said optical fiber from said channel is equal to or greater than about 0.01 Newton (N), as determined by retaining force test.

2. The coupling device of claim 1 wherein said force is equal to or greater than 0.1 Newton.

3. The coupling device of claim 2 wherein said force is equal to or greater than 0.5 Newton.

4. The coupling device of claim 3 wherein said force is equal to or greater than 0.75 Newton.

5. The coupling device of claim 4 wherein said force is equal to or greater than 1 Newton.

6. The coupling device of claim 1 wherein said force is from about 0.1 to about 1 Newton.

7. The coupling device of claim 1 wherein $W_1$ is from about 0.6 $d_1$ to about 0.99 $d_1$.

8. The coupling device of claim 7 wherein $W_1$ is about 0.8 $d_1$ to about 0.99 $d_1$.

9. The coupling device of claim 8 wherein $W_1$ is from about 0.9 $d_1$ to about 0.99 $d_1$.

10. The coupling device of claim 8 wherein $d_2$ is from greater than $\frac{1}{2} d_1$ to about 2 $d_1$.

11. The coupling device of claim 10 wherein $d_2$ is from about 0.6 $d_1$ to about 0.99 $d_1$.

12. The coupling device of claim 11 wherein $d_2$ is from about 0.8 $d_1$ to about 0.99 $d_1$.

13. The coupling device of claim 12 wherein $d_2$ is from about 0.9 $d_1$ to about 0.99 $d_1$.

14. The coupling device of claim 1 wherein $d_1$ is preferably equal to or less than 1 mm.

15. The coupling device of claim 14 wherein $d_1$ is from about 125 $\mu$mm to about 1 mm.

16. The coupling device of claim 15 wherein $d_1$ is from about 125 $\mu$mm to about 250 $\mu$m.

17. The coupling device of claim 16 wherein $d_1$ is from about 125 $\mu$m to about 140 $\mu$m.

18. The coupling device of claim 1 wherein $W_2$ is greater than $d_1$ to about 2 $d_1$.

19. The coupling device of claim 18 wherein $W_2$ is from about 1.0 $d_1$ to about 1.5 $d_1$.

20. The coupling device of claim 19 wherein $W_2$ is from about 1.0 $d_1$ to about 1.2 $d_1$.

21. The coupling device of claim 20 wherein $W_2$ is from about 1.0 $d_1$ to about 1.1 $d_1$.

22. The coupling device of claim 1 wherein said sidewalls are straight or substantially straight.

23. The coupling device of claim 1 wherein said polymer is crosslinked above its gel point.

24. The coupling device of claim 1 wherein said polymer has a glass transition temperature equal to or less than about 30° C.

25. An optical coupling device comprising:
    a substrate having a surface region at a pre-determined position on a surface of said substrate for placement of an optical waveguide; and
    a channel on the surface of said substrate for optically aligning and coupling an optical fiber having a diameter dimension $d_1$ and an optical waveguide positioned at said predetermined position, wherein the longitudinal axis of said channel is in alignment or substantially in alignment with said predetermined position such that on placement of said optical fiber in said channel and placement of said optical waveguide in said position the light carrying core of said fiber and said waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:
    (a) $W_2$ is greater than $W_1$;
    (b) $d_2$ is greater than $\frac{1}{2} d_1$; and
    (c) $d_1$ is greater than $W_1$ and is equal to or less than $W_2$,
wherein on placement of said optical fiber in said channel the force required to displace said optical fiber from said channel is equal to or greater than about 0.01 Newton (N), as determined by retaining force test.

26. An optical fiber to optical waveguide interconnect comprising:
    a substrate;

an optically transmissive waveguide positioned on a surface of said substrate; and a channel on the surface of said substrate for optically aligning and coupling an optical fiber having a diameter dimension $d_1$ and said optical waveguide, wherein the longitudinal axis of said channel is in alignment or substantially in alignment with said waveguide, said channel having said optical fiber positioned therein such that the light carrying core of said fiber and said waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:

(a) $W_2$ is greater than $W_1$;
(b) $d_2$ is greater than $\frac{1}{2} d_1$; and
(c) $d_1$ is greater than $W_1$ and is equal to or less than $W_2$, wherein the force required to displace said optical fiber from said channel is equal to or greater than about 0.01 Newton (N), as determined by retaining force test.

27. An improved pigtailed planar optical device having a plurality of optical waveguide to optical fiber interconnects of claim 26.

28. A packaged planar optical device comprising the improved pigtailed planar optical device of claim 27 enclosed in a polymeric package.

29. A method for forming an optical coupling device comprising a substrate having a surface region at a pre-determined position on a surface of said substrate for placement of an optical waveguide, and a polymeric optical fiber positioning element for optically aligning and coupling an optical fiber having a diameter $d_1$ and said optical waveguide positioned at said predetermined position, said polymeric optical fiber positioning element comprising a channel having sidewalls, wherein the longitudinal axis of said channel is in alignment or substantially in alignment with said pre-determined position, such that on placement of said optical fiber in said channel and said optical waveguide in said pre-determined position, said optical fiber and said optical waveguide are in optical alignment or substantially in optical alignment, said channel having said optical fiber positioned therein such that the light carrying core of said fiber and said waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:

(a) $W_2$ is greater than $W_1$;
(b) $d_2$ is greater than $\frac{1}{2} d_1$; and
(c) $d_1$ is greater than $W_1$ and is equal to or less than $W_2$, wherein on placement of said optical fiber in said channel the force required to displace said optical fiber from said channel is equal to or greater than about 0.01 Newton (N), as determined by retaining force test, said method comprising the steps of:

a) placing a layer comprising one or more photopolymerizable monomers onto a surface of a substrate;

b) exposing said layer to a pattern of actinic radiation to form an exposed pattern of polymerized monomer having the surface dimensions of said polymer positioning element and a pattern of unexposed monomer; and c) developing said layer by removing said unexposed monomer to form said polymer positioning element on the surface of said substrate wherein the longitudinal axis of said channel is in alignment or is substantially in alignment with said position.

30. A method for forming an optical coupling device with an optical waveguide comprising a substrate, an optically transmissive waveguide positioned on a surface of said substrate, and a polymeric optical fiber positioning element for optically aligning and coupling an optical fiber having a diameter $d_1$ and said optical waveguide, said polymeric optical fiber positioning element comprising a channel having sidewalls, wherein the longitudinal axis of said channel is in alignment or substantially in alignment with the longitudinal axis of said waveguide, such that on placement of said optical fiber in said channel said optical fiber and said optical waveguide are in optical alignment or substantially in optical alignment, said channel having said optical fiber positioned therein such that the light carrying core of said fiber and said waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:

(a) $W_2$ is greater than $W_1$;
(b) $d_2$ is greater than $\frac{1}{2} d_1$; and
(c) $d_1$ is greater than $W_1$ and is equal to or less than $W_2$, wherein on placement of said optical fiber in said channel the force required to displace said optical fiber from said channel is equal to or greater than about 0.01 Newton (N), as determined by retaining force test, said method comprising the steps of:

a) placing a layer comprising one or more photopolymerizable monomers onto a surface of a substrate, said surface having a waveguide thereon;

b) exposing said layer to a pattern of actinic radiation to form an exposed pattern of polymerized monomer having the surface dimensions of said polymer positioning element and a pattern of unexposed monomer; and c) developing said layer by removing said unexposed monomer to form said polymer positioning element on the surface of said substrate, wherein the longitudinal axis of said channel of said polymer positioning element is in alignment or substantially in alignment with the longitudinal axis of said waveguide.

31. A method for forming an optical coupling device with an optical waveguide comprising a substrate, an optically transmissive waveguide positioned on a surface of said substrate, and a polymeric optical fiber positioning element for optically aligning and coupling an optical fiber having a diameter $d_1$ and said optical waveguide, said polymeric optical fiber positioning element comprising a channel having sidewalls, wherein the longitudinal axis of said channel is in alignment or substantially in alignment with the longitudinal axis of said waveguide, such that on placement of said optical fiber in said channel said optical fiber and said optical waveguide are in optical alignment or substantially in optical alignment, said channel having said optical fiber positioned therein such that the light carrying core of said fiber and said waveguide are in optical alignment or substantially in optical alignment, said channel having sidewalls and a floor wherein the separation of said sidewalls at a cross-sectional depth dimension $d_2$ in the direction normal to said floor has a width $W_1$ and the separation of said sidewalls adjacent to said floor has a width $W_2$, wherein $W_1$, $W_2$, $d_1$, and $d_2$ are selected such that:

(a) $W_2$ is greater than $W_1$;
(b) $d_2$ is greater than $\frac{1}{2} d_1$; and
(c) $d_1$ is greater than $W_1$ and is equal to or less than $W_2$, wherein on placement of said optical fiber in said channel the force required to displace said optical fiber from said channel is equal to or greater than about 0.01 Newton (N), as determined by retaining force test, said method comprising the steps of:

a) placing a layer comprising one or more photopolymerizable monomers onto a surface of a substrate;

b) exposing said layer to a pattern of actinic radiation to form an exposed pattern of polymerized monomer having the surface dimensions of said polymer positioning element and of said waveguide, and a pattern of unexposed monomer; and c) developing said layer by removing said unexposed monomer to form said polymer positioning element and said waveguide on the surface of said substrate, wherein the longitudinal axis of said channel is in alignment or substantially in alignment with the longitudinal axis of said waveguide.

* * * * *

UNITED STATES PATENT AND TRADEMARK OFFICE
CERTIFICATE OF CORRECTION

PATENT NO. : 5,359,687

DATED : October 25, 1994

INVENTOR(S) : McFarland, et al.

It is certified that error appears in the above-identified patent and that said Letters Patent is hereby corrected as shown below:

Column 24, line 16:  Change "μmm" to -- μm --.

Column 24, line 18:  Change "umm" to -- μm --.

Signed and Sealed this

Fifteenth Day of October, 1996

*Attest:*

BRUCE LEHMAN

*Attesting Officer*  *Commissioner of Patents and Trademarks*